Dec. 8, 1925.
F. J. COUCKE
1,564,327
HEATING APPARATUS
Filed Aug. 2, 1924
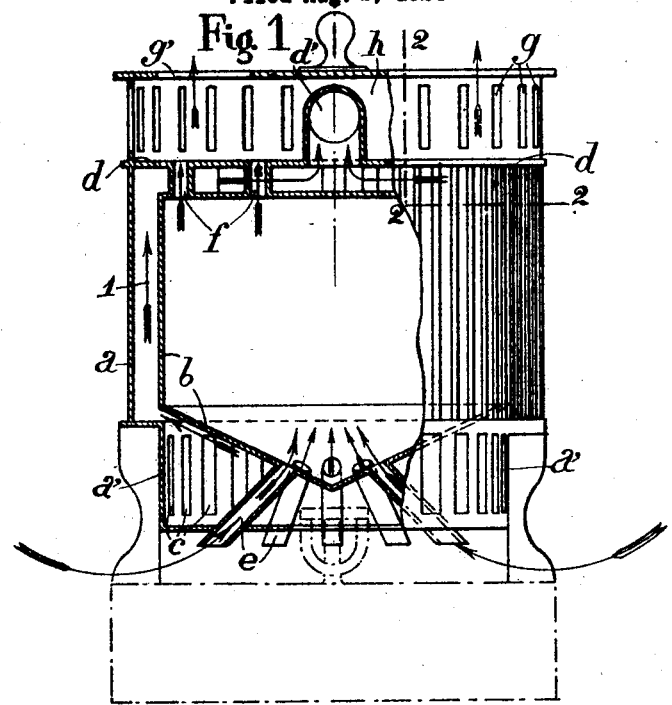
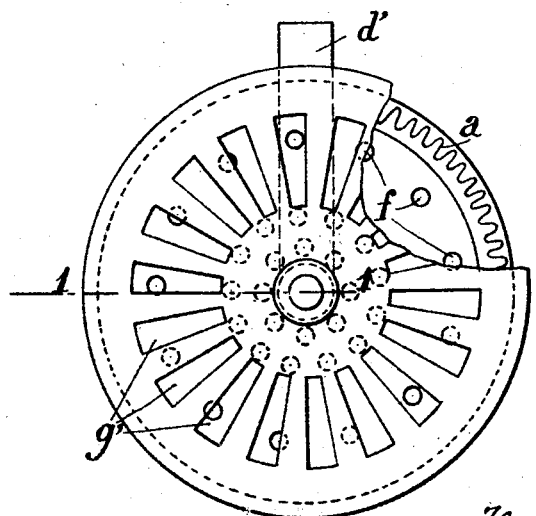
Inventor:
Florimond Joseph Coucke Patented Dec. 8, 1925.

1,564,327

UNITED STATES PATENT OFFICE.

FLORIMOND JOSEPH COUCKE, OF LYON-VILLEURBANNE, FRANCE.

HEATING APPARATUS.

Application filed August 2, 1924. Serial No. 729,691.

*To all whom it may concern:*

Be it known that I, FLORIMOND JOSEPH COUCKE, a citizen of Belgium, and resident of Lyon-Villeurbanne, in the county of Rhone and State of France, have invented certain new and useful Improvements in Heating Apparatus, of which the following is a specification.

My invention relates to heating apparatus, and the object of the present invention is to produce a heating apparatus in which a minimum of fuel is consumed.

The heating apparatus, according to my invention, comprises a cylindrical diffuser having an inverted cone-shaped bottom pointing downwards and a corrugated outer casing so arranged as to form with the said diffuser an annular compartment for conducting the burnt gases upwards to the chimney. Within pipes concentrically arranged in the cone-shaped portion of the diffuser air is heated which ascends and escapes into the room through a number of openings provided at the upper end of the diffuser.

In the drawing, Fig. 1 is an elevational view of the heating apparatus with a portion broken out to show the inner construction; Fig. 2 is a top plan view with a portion broken out.

The apparatus comprises a corrugated outer casing $a$ concentrically surrounding the cylindrical body-portion of an inverted diffusing cone $b$ forming therewith an annular compartment 1, and the point of which is located over the burner to which a suitable fuel is supplied. The casing $a$ has a cylindrical extension $a'$ provided with windows $c$ of mica, or any other heat-resisting transparent material. The top of the casing $a$ forms with the top of the diffuser $b$ a compartment $d$ connected with exhaust pipe $d'$. The lower portion of diffuser $b$ forms an air chamber communicating with the outside by means of a number of pipes $e$ which enter the cone-shaped portion near its point. The upper portion of diffuser $b$ communicates with the outside through the openings $f$ extending through the compartment $d$. Above the compartment $d$ is a drum-shaped casing $h$ provided in its walls with narrow openings $g$, $g'$.

The apparatus operates as follows:

The cone-shaped portion of the diffuser $b$ is heated by the flame of the burner, and the burnt gases pass along the outside of the cone into the annular compartment 1 between the outer casing $a$ and the cylindrical portion $b$ of the diffuser in the direction of the arrows, and then into the compartment $d$, from where they escape through the exhaust pipe $d'$. The air entering through the pipes $e$ into chamber $b$ becomes heated and growing lighter ascends in the said chamber $b$ and passes through the opening $f$ and $g$ into the room.

The corrugations of the outer casing $a$ greatly increase the heating surface traversed by the hot gases thus assisting in a high degree the radiation of heat, the burnt gases giving up their heat and entering the exhaust pipe $d'$ nearly cold. On the other hand, the heating effect is increased by the current of hot air entering through the pipes $e$ into the diffuser $b$ which is heated by the hot gases as they circulate in the annular compartment 1, surrounding the diffuser $b$. This current of hot air escapes into the room through the upper openings $f$ and $g$, $g'$. Thus, a combined heating effect is produced both by radiation and by an intense circulation of hot air.

I claim as my invention:

In a heating apparatus, a burner, an external corrugated casing, an inner cylindrical casing concentric therewith having a cone-shaped portion directed toward said burner and spaced from said external casing so as to form an annular duct for the gases of combustion, a compartment formed by a transverse partition in the external casing and the inner casing disposed over the top of the heater, an exhaust pipe in communication with said compartment, pipes entering the cone shaped portion to supply outside air thereto for heating and said compartment having passageways therethrough for the discharge of the heated air.

FLORIMOND JOSEPH COUCKE.